United States Patent
Sudo

(10) Patent No.: US 6,528,007 B1
(45) Date of Patent: Mar. 4, 2003

(54) PRODUCTION PROCESS OF RUBBER PLUGS

(75) Inventor: Morihiro Sudo, Tokyo (JP)

(73) Assignee: Daikyo Seiko, Ltd., Tokyo (JP)

( * ) Notice: Subject to any disclaimer, the term of this patent is extended or adjusted under 35 U.S.C. 154(b) by 315 days.

(21) Appl. No.: 09/614,125

(22) Filed: Jul. 11, 2000

(30) Foreign Application Priority Data

Jul. 12, 1999 (JP) .......................................... 11-197263

(51) Int. Cl.⁷ ............................................... B29C 71/04
(52) U.S. Cl. ........................ 264/491; 264/492; 264/233; 264/340; 134/25.4
(58) Field of Search ................................ 264/492, 491, 264/233, 340, 236, 344; 134/120, 182, 25.1, 25.4

(56) References Cited

U.S. PATENT DOCUMENTS

| 4,441,621 A | 4/1984 | Matukura et al. |
|---|---|---|
| 4,614,276 A | 9/1986 | Ihara et al. |
| 4,915,243 A | 4/1990 | Tatsumi et al. |
| 4,997,423 A | 3/1991 | Okuda et al. |
| 5,009,646 A | 4/1991 | Sudo et al. |
| 5,078,941 A | 1/1992 | Tatsumi et al. |
| 5,110,621 A | 5/1992 | Sudo et al. |
| 5,114,794 A | 5/1992 | Sudo et al. |
| 5,288,560 A | 2/1994 | Sudo et al. |
| 5,845,797 A | 12/1998 | Sudo et al. |
| 5,901,718 A | * 5/1999 | Morimoto et al. |
| 5,908,688 A | 6/1999 | Okada et al. |

FOREIGN PATENT DOCUMENTS

JP 7-184978 * 7/1995

* cited by examiner

*Primary Examiner*—Mathieu D. Vargot
(74) *Attorney, Agent, or Firm*—Oblon, Spivak, McClelland, Maier & Neustadt, P.C.

(57) ABSTRACT

Rubber plugs, which are to be used with medical containers or medical devices, are produced by forming a vulcanizable, mixed rubber compound, vulcanizing a resultant formed rubber compound, treating the rubber plug with steam of high temperature and high pressure, treating the rubber plugs in an aqueous solution which has been adjusted to be acidic, rinsing the rubber plugs with high-quality water, washing the rubber plugs with a shower of dust- and germ-free water, and drying the rubber plugs by at least one of far infrared radiation and high frequency heating. The process makes it possible to reduce the number of insoluble fine particles, which are attracted on a surface of each rubber plug, to an extremely low level and moreover, remove (or deactivate) pyrogen substances on and in the vicinity of the surface of the rubber plug.

5 Claims, No Drawings

PRODUCTION PROCESS OF RUBBER PLUGS

BACKGROUND OF THE INVENTION a) Field of the invention

This invention relates to a production process of rubber plugs, and more specifically to a process for producing rubber plugs to be used with medical containers or medical devices, each of said rubber plugs being reduced in the number of insoluble fine particles attracted on a surface of the rubber plug while pyrogen substances having been removed (or deactivated) on and in the vicinity of the surface of the rubber plug. The term "insoluble fine particles" means fine particles insoluble in liquid medicine and will hereinafter be referred to simply as "fine particles".

b) Description of the Related Art

Rubber plugs made of butyl rubber, chlorinated butyl rubber or the like have been used for many years as opening stoppers for medical containers, such as bottles for infusions, vials and bottles for medicaments and experimental reagents, and vials and bottles for injections, and also for medical devices such as combination container-and-syringes.

A variety of rubber plugs for medical containers or medical devices, such as those described above, are generally obtained through a kneading step, a forming step (vulcanization step) and a punching step (pressing step). The kneading step comprises adding a vulcanizing agent and other additives to feed rubber and then kneading the resulting mixture to prepare a vulcanizable, mixed rubber compound. The forming step comprises forming the vulcanizable, mixed rubber compound into a burr-like sheet, which is provided with rubber plugs of a predetermined shape formed thereon, by compression molding or injection molding and then vulcanizing the burr-like sheet. The punching step, on the other hand, comprises individually cutting the rubber plugs apart from the formed sheet.

The rubber plugs, which have been cut apart, are processed through a washing step, which make use of chemical reagents (alkali, acid, and the like) and high-quality water, and a drying step. The thus-obtained rubber plugs are subjected to a final inspection step, in which the resultant rubber plugs are inspected for external appearances and any attracted materials, and further to a final visual inspection and a sanitary test to determine whether or not they meet various official standards specified in "Tests for Rubber Plugs to Be Used with Infusions" in the first addendum of the thirteenth edition of the Pharmacopoeia of Japan. Those determined to meet the official standards are packed and shipped. Concerning sanitary requirements for rubber plugs, specification values are set not only in the Pharmacopoeia of Japan but also in the Pharmacopoeias in various European and American countries.

Rubber plugs, to which the present invention can be applied, are produced using desired one of various rubbery polymers as a primary material. As a characteristic property of a high-molecular substance, however, a rubbery polymer tends to have a static charge by friction. In the course of production of rubber plugs, formed rubber plugs are successively conveyed to subsequent steps by belt conveyors or the like. During these conveyance, rubber plugs are brought into contact with each other within a transportation container. The rubber plugs are therefore electrostatically charged, leading to a problem that in each step, contaminants such as fine particles, lint and hairs in an environment are attracted onto surfaces of the rubber plugs.

Especially when a material attracted on the rubber plugs is in the form of fine particles, mixing of such fine particles into medicaments (powdery or liquid medicines) in medical devices, such as syringes, making use of the rubber plugs is unavoidable irrespective of the amount of the fine particles. Injection of a medicament, such as an injectable preparation, with such fine particles mixed therein into the human body involves a potential danger that the fine particles in the medicament may develop a serious problem detrimental to the human life such as clotting of a blood vessel in the human body. In the Pharmacopoeia of each country, specification limits are hence regulated regarding the size and number of fine particles in an injectable preparation per unit volume of the injectable preparation. In Japan, a test for insoluble foreign substances in an injectable preparation and a test for fine particles in an injectable preparation are specified as general tests in the first addendum of the thirteenth edition of the Pharmacopoeia. Likewise, they are also specified as general tests in the Pharmacopoeia of the United States of America. These tests in the individual countries specify the above-described specification limits.

Concerning rubber plugs, no specification value is set for fine particles attracted on the rubber plugs in the above-described "Tests for Rubber Plugs to Be Used with Infusions" of the Pharmacopoeia of Japan. In view of the above-described circumstances, however, the Applicant is performing at its own volition an inspection for fine particles attracted on rubber plugs. As a reduction in the number of fine particles attracted on a rubber plug leads to a decrease in the number of fine particles in an injectable preparation, there is an ever-increasing demand from drug makers toward rubber plugs with fewer fine particles attracted thereon.

Attraction of fine particles onto rubber plugs in the course of their production is attributed to frictional electrification of the rubber plugs as described above. In attempts to reduce attraction of fine particles, measures have hence been taken including cleaning of air in a working environment, lessening of mutual friction of rubber plugs, omission of any step in which a worker touches rubber plugs by hand. No satisfactory results, however, have been obtained yet.

SUMMARY OF THE INVENTION

An object of the present invention is, therefore, to provide a production process for rubber plugs to be used with medical containers or medical devices, which makes it possible to reduce attraction of fine particles (which is generally called "fine particle contamination").

The present inventors have proceeded with an extensive investigation to achieve the above-described object. As a result, it has been found that improvements in washing and drying steps for rubber plugs make it possible to reduce attraction of fine particles onto the rubber plugs, leading to the completion of the present invention.

To achieve the above-described object, the present invention provides a process for producing rubber plugs, which are to be used with medical containers or medical devices, by forming a vulcanizable, mixed rubber compound and vulcanizing a resultant formed rubber compound, which comprises the following additional consecutive steps:

1) treating the rubber plugs with steam of high temperature and high pressure;
2) treating the rubber plugs in an aqueous solution which has been adjusted to be acidic;
3) rinsing the rubber plugs with high-quality water;
4) washing the rubber plugs with a shower of dust- and germ-free water; and 5) drying the rubber plugs by at least one of far infrared radiation and high frequency heating.

According to the present invention, rubber plugs reduced to an extremely low level in the number of fine particles attracted thereon are provided for use with medical containers or medical devices.

DETAILED DESCRIPTION OF THE INVENTION AND PREFERRED EMBODIMENTS

No particular limitation is imposed on a material for use in the process of the present invention for the production of the rubber plugs, and rubber materials conventionally employed in the production of rubber plugs for medical containers or medical devices and plastic materials used in combination with such rubber materials are all usable. Examples of the rubber materials can include butyl-type rubbers such as butyl rubber, chlorinated butyl rubber, brominated butyl rubber and divinylbenzene terpolymer butyl rubber; conjugated diene rubbers such as polyisoprene rubber (high to low contents of cis-1,4 bonds), polybutadiene rubber (high to low contents of cis-1,4 bonds) and styrene-butadiene copolymer rubber; and ethylene-propylene-diene terpolymer rubbers (EPDM). Examples of the plastic materials are led by various fluorinated resins and can include polyethylene, polypropylene, polyamides and polyesters.

In the present invention, the rubber plugs can be produced by employing a vulcanizable, mixed rubber compound, which can be obtained by kneading the above-described rubber material with a vulcanizing agent, a filler and/or additives such as a reinforcing agent, a colorant and an age resister, and by using a conventionally-known forming technique for rubber plugs, such as compression molding or injection molding. As the additives, those conventionally used in the production of rubber plugs for medical containers or medical devices are usable, and no particular limitation is imposed on the additives.

Illustrative of the rubber plugs are rubber plugs produced only with a vulcanizable, mixed rubber compound; rubber plugs laminated with films of plastics such as fluorinated resin or polyethylene on at least surfaces where the rubber plugs may be brought into contact with medicine or the like; and composite molded products of the above-described rubber plugs and plastic members, said composite molded products being to be joined by fusion bonding to plastic-made openings of bags for infusions. No particular limitations are imposed on the shapes and structures of these rubber plugs. Specific examples can include rubber plugs for vials (rubber plugs for powdery preparations, rubber plugs for detergents, rubber plugs for lyophilized pharmaceutical preparations, and the like), rubber plugs for infusions, pistons and caps of syringes and combination container-and-syringes, and composite molded products of rubber plugs and plastic members (for example, pull-top rubber plugs, rubber plugs for the openings of the above-described bags for infusions).

Rubber plugs such as those described above can be produced as will be described hereinafter. In a forming step, a vulcanizable, mixed rubber compound which has been prepared by kneading a rubber material with various additives is formed into a sheet, which is provided with many rubber plugs of a predetermined shape formed thereon such that the rubber plugs are united together via the sheet, by compression molding or injection molding, and the sheet is vulcanized together with the rubber plugs formed thereon.

Subsequent to a visual inspection by the eye, a punching step is conducted to individually cut the rubber plugs apart from the formed sheet. The rubber plugs are then sent to washing and drying steps. In the case of rubber plugs other than rubber plugs laminated with plastic films, the above-described formed sheet, depending on the type of the rubber plugs, may be additionally processed through a silicone treatment step after the forming step. In the silicone treatment step, the formed sheet is coated with acrosslinking (curable) silicone composition, and the silicone composition is then crosslinked such that the silicone composition is firmly united to surfaces of the rubber plugs. Unreacted silicone can be fully removed from these rubber plugs by processing them through a washing step to be described subsequently herein. This makes it possible to avoid an increase in the level of fine particles on the final products which would otherwise take place due to remaining unreacted silicone.

Characteristic features of the present invention reside in the washing and drying steps for rubber plugs subsequent to their forming.

A description will first be made about the washing step. The washing step in the present invention comprises the following five consecutive steps:

1) treating the rubber plugs, which have been obtained as described above, with steam of high temperature and high pressure;
2) treating the rubber plugs in an aqueous solution which has been adjusted to be acidic;
3) rinsing the rubber plugs with high-quality water;
4) washing the rubber plugs with a shower of dust- and germ-free water; and
5) drying the rubber plugs.

In step 1), fine particles attracted on a surface of each rubber plug, other fouling, substances dissolved from the rubber plug, pyrogen substances (pyrogens) and the like are removed. This step is conducted in an autoclave by using steam of high temperature and high pressure. Preferably, an aqueous alkaline solution, for example, an aqueous solution the pH of which has been adjusted to 8 to 12, preferably 8.5 to 11 with NaOH (in general, a 0.05 to 0.15 wt. % aqueous solution of NaOH) is used. Deionized water is used as water. The alkalinizing agent is not limited to NaOH, and other alkaline substances are usable.

In step 1), the rubber plugs are placed preferably in an alkali-resistant and acid-resistant vessel, for example, a mesh basket made of stainless steel, the mesh basket with the rubber plugs placed therein is dipped in an aqueous alkaline solution held in an autoclave, and the rubber plugs are treated generally at 100 to 150° C. (at 101 to 400 kPa in terms of autoclave internal pressure), preferably 110 to 145° C., more preferably 130 to 140° C. The treatment time may generally range from 10 to 90 minutes, although this varies depending on the type of the rubber plugs and the treatment temperature. Depending on the material making up the rubber plugs, the rubber plugs may undergo thermal deterioration. It is, therefore, necessary to determine the treatment temperature and time by taking into consideration effects of the treatment and the deterioration of the rubber plugs. After the treatment, the mesh basket is pulled out of the autoclave, and the rubber plugs are treated in the subsequent neutralization step.

In the present invention, pre-washing (provisional washing) may be conducted, as needed, before the treatment of the rubber plugs in step 1) to remove various fouling, which have been attracted or otherwise deposited on the rubber plugs, with neutral detergent or the like having high sanitary property.

In step 2), the rubber plugs obtained in step 1) are treated in an aqueous solution which has been adjusted to be acidic. When the treatment in step 1) is conducted using the above-described aqueous alkaline solution, the alkaline substance deposited on the rubber plugs is neutralized with the aqueous acidic solution. The neutralization can be conducted, for example, by dipping the mesh basket with the rubber plugs placed therein in an acidic neutralizing solution and then slowly rotating the mesh basket such that the rubber plugs are brought into full contact with the neutralizing solution. Weak acidity is sufficient for the neutralizing solution. No particular limitation is imposed on an acid as a neutralizing agent and, for example, a mineral acid such as hydrochloric acid can be used. In general, a 0.05 wt. % aqueous solution of hydrochloric acid is used. No particular limitation is imposed on the temperature of the treatment, and the treatment is conducted generally at room temperature to 50° C. or so for about 10 to 20 minutes. Upon completion of the neutralization, the mesh basket is pulled out of the neutralizing solution, and the rubber plugs will then be washed with clean water in the next step.

In step 3), the rubber plugs treated in step 2) are washed with deionized water. No particular limitation is imposed on the manner of the washing. For example, the mesh basket with the rubber plugs placed therein is dipped in a washing tank filled with deionized water. The mesh basket is slowly rotated to wash the rubber plugs. To prevent further attraction of fine particles onto the rubber plugs from the washing water in this step, it is preferred to use, as washing water, high-quality water obtained by removing fine particles, bacteria and the like from deionized water, for example, through a filter having a pore size not greater than 0.2 $\mu$m. Although no particular limitation is imposed on the temperature of the washing water, it is effective and preferable to wash the rubber plugs while boiling the washing water. The washing time may generally range from 5 to 60 minutes or so although it varies depending on the type of the rubber plugs and the washing temperature. After completion of the washing, the mesh basket is pulled out and water is fully drained. The rubber plugs are then taken out of the mesh basket and are transferred and spread on a meshed conveyor belt to permit the next treatment.

In step 4), the rubber plugs which have been washed with the high-quality water in step 3) are showered with washing water of still higher quality to wash the rubber plugs. It is preferred to conduct this step and the next drying step 5) in a tunnel through which air of a cleanliness class in a range of from 100,000 to 1,000 (the number of fine particles having particle sizes of 0.5 $\mu$m and greater in 1 ft$^3$ is 100,000 to 1,000; U.S. Federal Standard 209E) is flowing. The washing water of the still higher quality, which is used in this step, can be prepared by filtering water, the quality of which is equivalent to that of the high-quality water used in step 3), through an ultrafiltration membrane a fractionation molecular weight of which is not lower than 6,000, and is water free of dust, germs and pyrogens. To remove fine particles which have not been removed by the preceding steps, the water of still higher quality is showered over the entire surfaces of the rubber plugs placed on the moving meshed conveyor belt so that the remaining fine particles are washed off from the rubber plugs by a water jet in the showering direction (for example, an upward or downward water jet) and an impact produced by the water jet.

From the rubber plugs washed through the washing step comprising the above-described steps 1) to 4), materials attracted on the rubber plugs before the washing step, such as fine particles, have been removed to an extremely high level. In the next drying step 5), conventional drying with hot air is therefore not preferred because hot air often contains fine particles and results in further attraction of fine particles onto the rubber plugs. It is a preferred drying method to heat the rubber plugs by far infrared radiation or high frequency radiation. Far infrared radiation is suited for drying water on the surfaces of the rubber plugs, but is not considered to be fully suited for drying water penetrated inside the rubber plugs. It is a particularly preferred drying method to dry by high frequency heating.

Water, which has adhered on the surfaces of the rubber plugs or has been adsorbed in the vicinity of the surfaces in the above-described washing step, is removed (dried) when heated by high frequency radiation even if the rubber material making up the rubber plugs is a rubber material of high polarity. Water inside the rubber plugs is also removed (dried) at the same time. Even if a rubber material making up the rubber plugs is a non-polar material, the rubber plugs tend to adsorb water because some substances of high polarity are used as additives. Use of high frequency heating, however, can bring about similar high drying effect as in the case of rubber plugs making use of a rubber material of high polarity. The heat output of the high frequency heating may generally range, but is not limited to, from approximately 1 to 5 KW. From the standpoint of heightening the drying effect for rubber plugs, it is preferred to arrange plural high frequency heaters at different locations along the traveling direction of the meshed conveyor belt.

The rubber plugs, the drying of which has been completed, are then transferred by the conveyor belt into a clean room the cleanliness of which is of a class in a range of from 100,000 to 1,000, where the rubber plugs receive a final visual test. With respect to rubber plugs which have passed the final visual test, a test for dissolved substances and a test for sanitary properties are conducted as specified in the Pharmacopoeia of Japan, and a test for fine particles is also conducted as designed by the Applicant, K.K. Daikyo Gomu Seiko. Rubber plugs which have passed all of these tests are placed and sealed in a dust-free plastic bag and are shipped.

The present invention will hereinafter be described more specifically by Examples and Comparative Examples.

EXAMPLE 1

From a mixed compound of butyl rubber, 2,500 rubber plugs for vials were produced by compression molding. Each rubber plug had an outer (flange) diameter of 19 mm at a top portion (a flange), a flange thickness of 3.2 mm, a leg diameter of 13 mm, a leg height of 5 mm, and an overall height of 8.2 mm. Five hundreds (500) of the rubber plugs were subjected to washing which consisted of the following steps.

Step 1)

In an autoclave filled with a 0.10 wt. % aqueous solution of NaOH (in which deionized water was used as water), a mesh basket made of stainless steel and containing the 500 rubber plugs was dipped. While rotating the mesh basket at 5 full turns per minute, the rubber plugs were treated at 130° C. for 60 minutes. Heating was stopped, pressure was released, and the mesh basket was then pulled out of the autoclave. After water was drained, the rubber plugs were sent to the next step 2).

Step 2)

The mesh basket, which contained the rubber plugs treated in step 1), was dipped in a neutralizing tank filled with a 0.05 wt. % aqueous solution of hydrochloric acid (in which deionized water was used) of room temperature, and neutralization was conducted for 10 minutes while slowing moving the mesh basket up and down. The mesh basket was then pulled out. After water was drained, the rubber plugs were sent to the next step 3).

Step 3)

The mesh basket which contained the rubber plugs treated in step 2) was dipped in a washing tank, from which high-quality water prepared by filtering deionized water through an ultrafiltration membrane having an average pore size of about 0.2 $\mu$m was overflowing, while slowly moving the mesh basket up and down (dipping time: 10 minutes), whereby the rubber plugs were thoroughly washed. The mesh basket was then pulled out, and the rubber plugs were sent to the next steps 4) and 5).

Steps 4) and 5)

The rubber plugs which had been treated in step 3) were transferred from the mesh basket onto a meshed belt conveyor such that the rubber plugs did not pile up. While causing the rubber plugs to move through a tunnel the cleanliness of which was of the 1,000 class, each rubber plug was exposed to upward and downward showers of washing water of still higher quality for about 15 seconds. Incidentally, the washing water of the still higher quality was prepared by further filtering water of similar quality as the high-quality water, which had been employed in step 3), through an ultrafiltration membrane the fractionation molecular weight of which was not lower than 6,000.

The conveyor belt which had advanced through the above-described shower washing zone reached a drying zone, where surface and internal water of the rubber plugs was caused to evaporate by high frequency heating. In the drying zone, a high frequency heater (heat output: 4.5 KW) was arranged above the conveyor belt. As a result of passage through the drying zone, internal and surface water of the rubber plugs evaporated completely.

Before the treatment in step 1) and after the individual treatments in the subsequent steps, the rubber plugs were sampled ten by ten at random by using pairs of tweezers thoroughly washed with the above-described washing water of the still higher quality, respectively. Fine particles attracted on the ten rubber plugs sampled each time were counted by the below-described method after drying the rubber plugs where they had not been dried.

Counting Method of Fine Particles

Following "General Test 64, Test for Fine Particles in Injectable Preparation" in the Pharmacopoeia of Japan, thirteenth edition (first addendum), fine particles were counted by using a light-shielded, automatic fine particle counter ("RION KL-01", trade name for an automatic fine particle counter manufactured by Rion Co., Ltd.). The ten rubber plugs sampled each time were placed with a pair of tweezers in a specially-ordered 500-mL vial made of hard glass, followed by the addition of 300 mL of washing water of the same quality as the washing water of the still higher quality used in steps 4) and 5) After the vial was sealed with a "SEALON FILM" (trade name; product of Fuji Film Co., Ltd.), the vial was manually shaken for 20 seconds at a speed such that each of the rubber plugs made about two full turns per second. After the vial was left standstill for 1 hour, the water in the vial was sampled by setting the sample quantity at 10 mL per sampling. Fine particles in 10 mL of the water. This sampling was conducted three times, and an average of the three counts was calculated. The results of the above test are presented in Table 1.

COMPARATIVE EXAMPLE 1

Washing of rubber plugs was conducted in a similar manner as in Example 1 except that 500 of the rubber plugs were used and the alkali washing in step 1) was conducted at room temperature and atmospheric pressure with a 0.10 wt. % aqueous solution of NaOH (in which deionized water was used as water). Fine particles attracted on the rubber plugs were also counted in a similar manner as in Example 1. The results of the counting are presented in Table 2.

COMPARATIVE EXAMPLE 2

Washing of rubber plugs was conducted in a similar manner as in Example 1 except that 500 of the rubber plugs were used and the washing in step 3) was conducted with deionized water of quality equivalent to the deionized water before the ultrafiltration. Fine particles attracted on the rubber plugs were counted in a similar manner as in Example 1. The results of the counting are presented in Table 3.

COMPARATIVE EXAMPLE 3

Washing of rubber plugs was conducted in a similar manner as in Example 1 except that 500 of the rubber plugs were used and the shower washing in step 4) was conducted with water of the same quality as the high-quality water employed in step 3). Fine particles attracted on the rubber plugs were counted in a similar manner as in Example 1. The results of the counting are presented in Table 4.

COMPARATIVE EXAMPLE 4

Five hundreds (500) of the rubber plugs produced in Example 1 were used. From step 1) to step 4) in Example 1, the treatment in each step was conducted in a similar manner as in Example 1. Drying was conducted by drying the rubber plugs at 80° C. for 20 minutes in a hot air drier the cleanliness of which was of the 1,000 class. Fine particles attracted on the rubber plugs were counted in a similar manner as in Example 1. The results of the counting are presented in Table 5.

TABLE 1

(Example 1)

| Step | Particle size ($\mu$m) | | | | |
|---|---|---|---|---|---|
| | >2 | >5 | >10 | >20 | >30 |
| Untreated | >2000 | >300 | >50 | >2 | 0 |
| After treatment in step 1) | >200 | >50 | >10 | 0 | 0 |
| After treatment in step 2) | 69 | 11 | 1 | 0 | 0 |
| After treatment in step 3) | 56 | 9 | 0 | 0 | 0 |
| After treatment in step 4) | 45 | 2 | 1 | 0 | 0 |
| After treatment (drying) in step 5) | 29 | 6 | 0 | 0 | 0 |
| Standard set by K.K. Daikyo Gomu Seiko | <300 | <30 | <10 | <5 | <1 |

TABLE 2

(Comparative Example 1)

| Step | Particle size ($\mu$m) | | | | |
|---|---|---|---|---|---|
| | >2 | >5 | >10 | >20 | >30 |
| Untreated | >2000 | >300 | >50 | >2 | 0 |
| After treatment in step 1) | >200 | >50 | >10 | 0 | 0 |
| After treatment in step 2) | 128 | 47 | 9 | 0 | 0 |

TABLE 2-continued (Comparative Example 1)

| Step | Particle size (μm) | | | | |
|---|---|---|---|---|---|
| | >2 | >5 | >10 | >20 | >30 |
| After treatment in step 3) | 81 | 20 | 4 | 0 | 0 |
| After treatment in step 4) | 60 | 12 | 2 | 0 | 0 |
| After treatment (drying) in step 5) | 42 | 7 | 2 | 0 | 0 |

TABLE 3

(Comparative Example 2)

| Step | Particle size (μm) | | | | |
|---|---|---|---|---|---|
| | >2 | >5 | >10 | >20 | >30 |
| Untreated | >2000 | >300 | >50 | >2 | 0 |
| After treatment in step 1) | >200 | >50 | >10 | 0 | 0 |
| After treatment in step 2) | 72 | 11 | 2 | 0 | 0 |
| After treatment in step 3) | 70 | 13 | 2 | 0 | 0 |
| After treatment in step 4) | 52 | 7 | 1 | 0 | 0 |
| After treatment (drying) in step 5) | 44 | 6 | 1 | 0 | 0 |

TABLE 4

(Comparative Example 3)

| Step | Particle size (μm) | | | | |
|---|---|---|---|---|---|
| | >2 | >5 | >10 | >20 | >30 |
| Untreated | >2000 | >300 | >50 | >2 | 0 |
| After treatment in step 1) | >200 | >50 | >10 | 0 | 0 |
| After treatment in step 2) | 70 | 13 | 1 | 0 | 0 |
| After treatment in step 3) | 52 | 8 | 0 | 0 | 0 |
| After treatment in step 4) | 54 | 8 | 1 | 0 | 0 |
| After treatment (drying) in step 5) | 46 | 6 | 1 | 0 | 0 |

TABLE 5

(Comparative Example 4)

| Step | Particle size (μm) | | | | |
|---|---|---|---|---|---|
| | >2 | >5 | >10 | >20 | >30 |
| Untreated | >2000 | >300 | >50 | >2 | 0 |
| After treatment in step 1) | >200 | >50 | >10 | 0 | 0 |
| After treatment in step 2) | 69 | 11 | 1 | 0 | 0 |
| After treatment in step 3) | 56 | 9 | 0 | 0 | 0 |
| After treatment in step 4) | 45 | 2 | 1 | 0 | 0 |
| After treatment in step 5) (drying) | 85 | 16 | 6 | 0 | 0 |

What is claimed is:

1. A process for producing rubber plugs, which are to be used with medical containers or medical devices, by forming a vulcanizable, mixed rubber compound and vulcanizing a resultant formed rubber compound, which comprises the following additional consecutive steps:

1) treating said rubber plugs with steam of high temperature and high pressure;

2) treating said rubber plugs in an aqueous solution which has been adjusted to be acidic;

3) rinsing said rubber plugs with high-quality water, wherein said high-quality water is deionized water from which insoluble fine particles and bacteria have been removed via a filter having a pore size not greater than 0.2 μm;

4) washing said rubber plugs with a shower of dust- and germ-free water; and 5) drying said rubber plugs by at least one of far infrared radiation and high frequency heating.

2. The process according to claim 1, wherein in step 1), said rubber plugs are placed in a mesh basket made of stainless steel, said mesh basket with said rubber plugs placed therein is dipped in an aqueous alkaline solution held within an autoclave, and said rubber plugs are then treated there at 100 to 150° C. and at 101 to 400 k Pa in terms of an internal pressure of the autoclave for 10 to 90 minutes.

3. The process according to claim 1, wherein in step 3), said rubber plugs are rinsed with said high-quality water while boiling said high-quality water.

4. The process according to claim 1, wherein in step 4), said dust- and germ-free water is prepared by filtering water, having a quality equivalent to that of said high-quality water used in step 3), through an ultrafiltration membrane having a fractionation molecular weight not lower than 6,000.

5. A process for producing rubber plugs, which are to be used with medical containers or medical devices, by forming a vulcanizable, mixed rubber compound and vulcanizing a resultant formed rubber compound, which comprises the following additional consecutive steps:

1) placing said rubber plugs in a mesh basket made of stainless steel, dipping said mesh basket with said rubber plugs placed therein in an aqueous alkaline solution held within an autoclave, and then treating said rubber plugs at 100 to 150° C. and at 101 to 400 kPa in terms of an internal pressure of the autoclave for 10 to 90 minutes;

2) neutralizing alkaline substances, which have been attracted on said rubber plugs, in an aqueous solution which has been adjusted to be acidic;

3) rinsing said rubber plugs with high-quality water while boiling said high-quality water, said high-quality water having been obtained by causing deionized water to pass through a filter, a pore size of which is not greater than 0.2 μm, such that insoluble fine particles and bacteria are removed;

4) washing said rubber plugs with a shower of dust- and germ-free water in a tunnel through which air of a cleanliness in a range of from 100,000 to 1,000 is flowing, said dust-and germ-free water having been prepared by filtering water, a quality of which is equivalent to that of said high-quality water used in step 3), through an ultrafiltration membrane having a fractionation molecular weight not lower than 6,000; and 5) drying said rubber plugs by at least one of far infrared radiation and high frequency heating in a tunnel through which air of a cleanliness class in a range of from 100,000 to 1,000 is flowing.

* * * * *